Patented Feb. 4, 1941

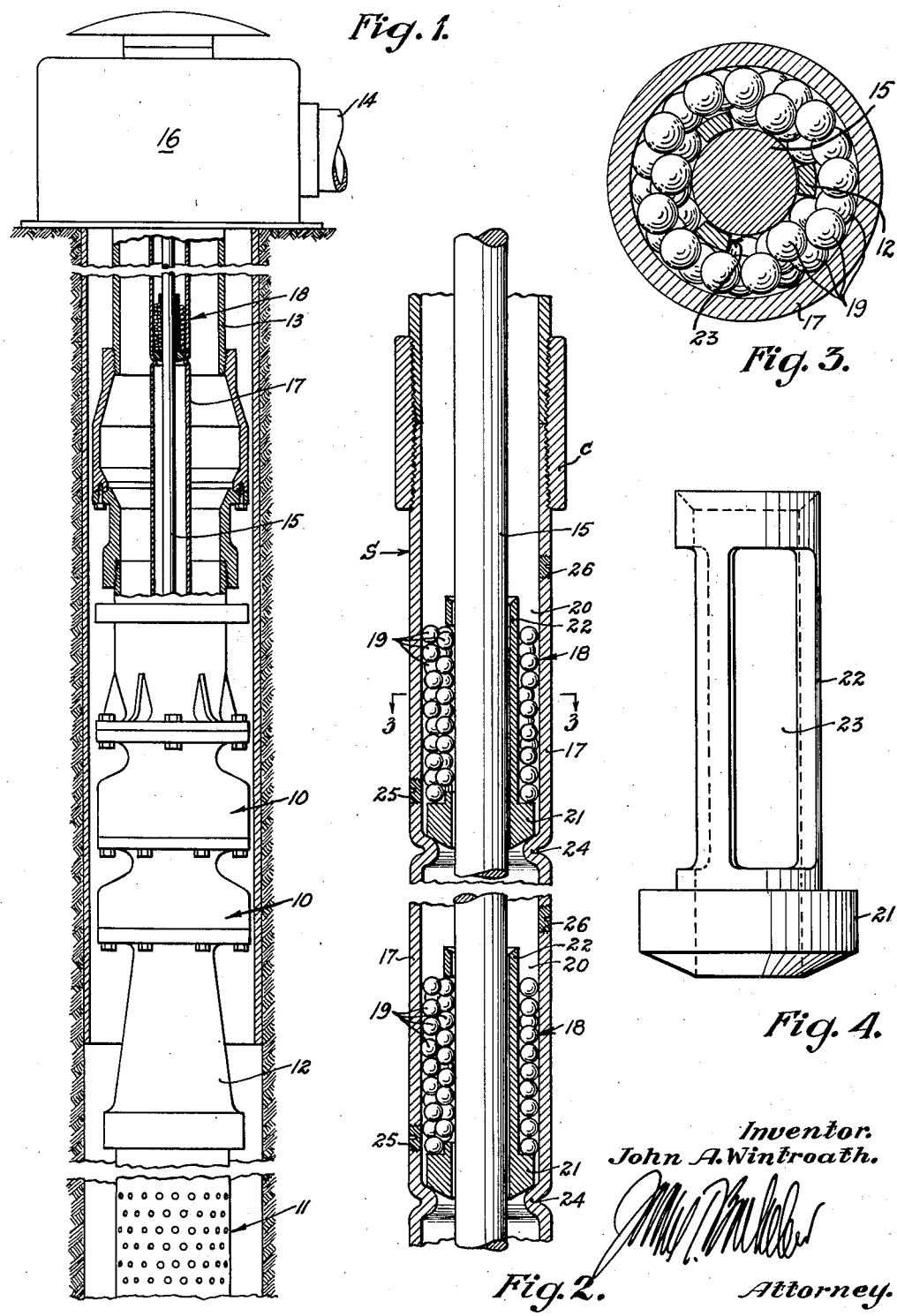

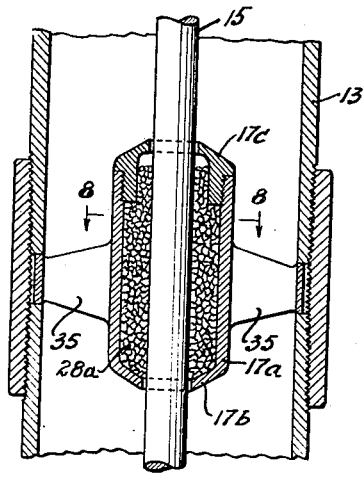
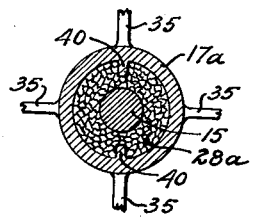
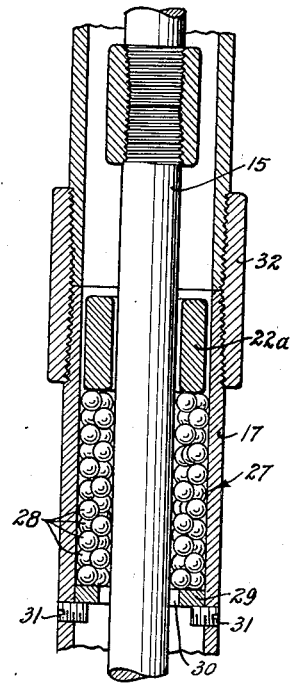
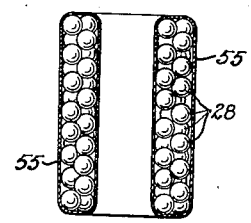
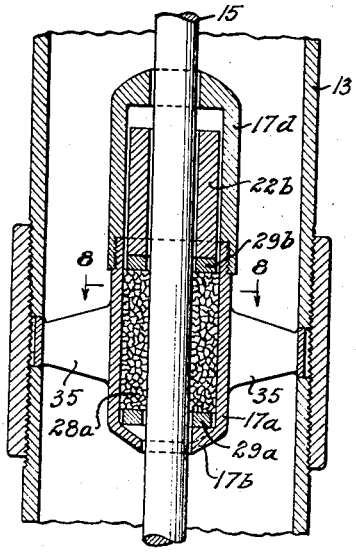
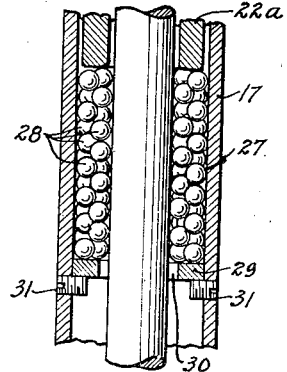
Inventor.
John A. Wintroath.
Attorney.

2,230,579

UNITED STATES PATENT OFFICE 2,230,579

SHAFT BEARING

John A. Wintroath, Los Angeles, Calif., assignor to Wintroath Pumps, Incorporated, Alhambra, Calif., a corporation of California Application February 3, 1939, Serial No. 254,419

14 Claims. (Cl. 308—183)

This invention has to do generally with shaft bearings, and although the objects and accomplishments of the invention are particularly well applicable to the vertical line shafts of deep well turbine pumps, the invention and its utilities are not necessarily restricted to such use. It is among the general objects, and corresponding accomplishments of the invention, that a bearing is provided possessing a number of outstanding advantages, both with respect to the structural and operating characteristics of the bearing itself, and with respect to economies in initial installation and upkeep.

Generally speaking, the bearing of the present invention has its greatest utility in a shaft-bearing combination where there is a tendency, due to any circumstances or means, of the shaft and bearing to seek or keep a relatively fixed alinement. One such instance, is the vertical line shaft of a deep well pump, which tends to seek and keep an alinement because of being under longitudinal tension. The objects and advantages of the invention may therefore well be shown in connection with such pump line shafts. These line shafts are of two kinds, "open" and "enclosed," to both of which the invention is desirably applicable; but as the enclosed type is perhaps more universal it will be more particularly considered.

Taking as typical the usual line shaft pump, in which the shaft is enclosed within tubing that extends substantially the full length of the shaft, the usual and almost invariable practice has been to journal the shaft at predetermined spaced points within sleeve bearings interconnecting and threaded into the ends of successive sections of the tubing. These bearings require lubrication by a lubricant introduced to the tubing, or must be made of expensive self-lubricating materials. In addition to having to be made of a proper, and relatively expensive bearing material, they must be designed for considerable strength, since they interconnect the tubing sections, and must withstand the tensile stresses normally imposed on the tubing.

Accordingly, the practice has been to use extra heavy tubing, cut in lengths corresponding to the bearing spacing with the ends of the tubing internally threaded to receive the bearings and accurately faced at right angles to the axis of the tubing in order to properly aline the bearings. Extra heavy tubing is required because of the fact that standard tubing does not have sufficient wall thickness to receive the internal thread and still retain the necessary tensile strength to insure against failure under load. The aggregate requirement of heavy tubing, accurate machining operations, and expensive bearings, have in the past resulted in unavoidable high manufacturing and repair costs that are multiplied where unusually long shafts and increased numbers of bearings must be furnished.

Construction costs have involved particularly serious consideration in the production of smaller pumps designed to operate at higher R. P. M. The larger units operate at lower R. P. M., use heavier shafts, and therefore permit the bearings to be spaced further apart, say at five foot intervals. For various reasons it is desirable and economical wherever possible to build smaller units with reduced shaft diameters for operation at higher speeds, the principal advantage being that since the capacity of the pump varies directly as the R. P. M. and the lift per pumping stage varies as the square of the R. P. M. the production from a pump of given size can greatly be increased by increasing its speed of operation. Also, the diameter of a line shaft designed for high speed operation can be considerably smaller since the horse power which a shaft is capable of transmitting varies directly with the R. P. M. The use of smaller, high speed pumps has however been interfered with largely by reason of the fact that shorter bearing spacings (say 2½ ft. as compared with 5 ft. in slower running pumps) have imposed cost limitations, particularly with the described bearing designs, that offset the advantages and economies of using smaller, high speed pumps.

From the foregoing it will be seen that the shaft bearings used in the past have themselves placed limitations on the cost of the entire unit, and the economic feasibility of using smaller, high speed pumps. My object is to provide a type of bearing for vertical turbine pump shafts that will not only avoid the excessive costs incident to the construction of smaller size high speed pumps, but will also reduce the bearing and over-all costs of all sizes of turbine well pumps. In accordance with the invention I have provided a bearing assembly comprising a plurality of independently movable bearing elements, preferably in random arrangement about the shaft, which themselves are of little cost and do not involve the use of heavy tubing and other expenses involved in the use of the ordinary bearings. Preferably I utilize bearing elements composed of materials having self-lubricating characteristics, such as of lead, the usual self-lubricating graphite impregnated metallic compositions, or other similar known materials characterized by their possessing sufficient strength for bearing purposes and having such low coefficient of friction in their engagement with each other and with the shaft, as to obviate any necessity for supplying lubricant to the bearings.

Preferably also these bearing elements are of materials that are somewhat soft and deformable in order that they may fit themselves to the shaft and to each other with individual bearing surfaces that, although individually small, are yet distinctly surfaces of some extent rather than mere points of contact. The form of the individual bearing elements may be either regular or irregular. Shot-size balls have been found effective, as have also the irregular machine tool cuttings from such materials as lead-bronze castings.

The bearing elements are supported in the tubing without the necessity of threading or otherwise weakening the tubing so as to reduce its strength. Consequently, standard weight tubing may be used. As a further advantage, the bearing elements may be very simply inserted in place within the tubing, and removed and replaced after they have become worn.

The invention has various additional features and advantages, but these as well as the objects stated above will be understood to better advantage from the following detailed description of the invention in certain of its typical and illustrative forms. Throughout the description reference is had to the accompanying drawings, in which:

Fig. 1 is a general view showing a typical deep well turbine pump, certain portions of the eduction column pipe and shaft enclosing tubing being shown in section;

Fig. 2 is an enlarged sectional view of one form of bearing assembly;

Fig. 3 is a section on line 3—3 of Fig. 2;

Fig. 4 is an elevation showing the bearing cage of this form of the invention;

Fig. 5 is a longitudinal section showing one variational form of the invention;

Fig. 6 is a longitudinal section showing a second variational form applied to an open line shaft;

Fig. 7 is a similar view showing a third variational form also applied to an open line shaft;

Fig. 8 is a cross-section on lines 8—8 of Figs. 6 and 7; and

Fig. 9 is a sectional view of a bearing package which may be used in connection with my invention.

The typical pump structure shown in Fig. 1 comprises the usual arrangement of impeller bowls 10 into which the well liquid is taken through the perforated pipe or screen 11 and adapter 12. The water is pumped upwardly through the eduction pipe 13 to the discharge line 14 by the usual impellers (not shown) contained within the bowls 10 and carried on line shaft 15 which is rotated by motor 16 at the ground surface. The line shaft 15 is enclosed within tubing 17 spaced annularly about the shaft and extending longitudinally substantially the full length of the shaft. The purpose of the tubing 17 is of course to protect the bearings from corrosion and abrasion by sand particles, and also to provide a housing for the bearings, one of which is generally indicated at 18, which journal the shaft at predetermined spaced intervals. As previously explained, the tubing ordinarily is placed under considerable tension, consequently requiring the use of extra heavy pipe and expensive bearings designed to take the tension load, where conventional types of coupling bearings have been used.

The line shaft 15 is also usually under longitudinal tension, as it carries not only its own weight but also usually the weight of the impellers and whatever hydrostatic head is placed on the impellers. The tensioning of the housing tubing 17 and shaft 15 make them tend to seek an alinement.

As shown in Fig. 2, my improved bearing assembly may comprise a plurality of bearing elements 19 forming a mobile mass of interengaging shot-size balls placed in random arrangement within the annular space 20 between the shaft 15 and the tubing or housing 17. Since the shaft is under vertical load only, and requires transverse support at the bearing point only for the purpose of preventing whipping or lateral vibration of the shaft, the bearing pressures are low. Consequently, it is possible to use bearing elements made of lead or other materials having relatively low compression strength, and which also, like lead bearings, possess self-lubricating characteristics so that it is unnecessary at any time to supply lubricant to the bearings. This applies not only while the pump is running but when it is started into operation, the engagement between the bearings and shaft being sufficiently lubricated by virtue of the qualities of the bearings themselves to impose no high starting torques.

In this illustrative form of the invention the mobile mass of bearing elements is vertically supported on the lower flange portion 21 of a tubular cage 22 having a slight clearance from the shaft and provided with a suitable number of circularly spaced, vertically extending slots 23, three being shown as typical, within which the balls project into engagement with the shaft. The cage 22 may be supported within the tubing 17 in any suitable manner, as simply by resting the bottom flange 21 of the cage on a shoulder 24 formed by annularly crimping the tubing. It is not necessary that the cage be fixed in the housing, it may merely float. And it also preferably has clearance within the housing. The principal purpose of using the cage 22 is to prevent bodily rotation of the mass of bearing elements with the shaft, and particularly the upper balls which may not be weighted sufficiently by the others to prevent them from becoming carried around by the shaft. The cage slots 23 confine the balls against bodily rotation with the shaft and thereby obviate bearing noises by preventing the balls from being thrown about within the tubing. Being substantially unconfined at the top surface, the mass of balls is displaceable longitudinally of the shaft, and consequently moves about to accommodate the shaft so as to render it self-alining. The ball elements also accommodate themselves to each other, and, being relatively soft and deformable, fit themselves with small bearing surfaces to the shaft. Thus, because of the loose characteristics of the cage and the mobility of the bearing elements, the shaft is free to seek its own alinement and will take and maintain a position vertically straight notwithstanding misalinement of the tubing sections.

The bearing also has self take-up characteristics in that notwithstanding progressive wear and reduction in size of the balls, they will still remain in proper bearing contact with the shaft. Another important feature is that after the balls have become worn so as to require replacement, they can be replaced in a very simple manner without having to remove the cage or even disconnect the tubing sections. For example, the worn bearings may be removed through a normally plugged opening 25 in the wall of the tubing directly above the bearing supporting flange. Similarly, new bearings may be inserted through opening 25, or through a second normally plugged opening 26 at the upper end of the cage. Since it is unnecessary to disconnect successive sections of the tubing for insertion or removal of the bearing elements, a single section, generally indicated at S, of standard weight tubing connected to adjacent sections by couplings C may be made as long as desired and may contain any suitable number of individual bearing assemblies. This feature obviates the relatively great cost in standard practice of requiring the tubing to be cut in sections corresponding to the number of bearings, and repair costs requiring the tubing sections to be disconnected and entire replacement of the coupling sleeve bearings.

Fig. 5 shows a variational form of the invention similar in general to the previously described bearing assembly, but differing mainly in the omission of the ball cage. Here the bearing assemblies 27 comprise the mobile mass of bearing elements 28 placed in random arrangement within and fully occupying the annular space between the shaft and tubing. The mass of bearing elements is vertically supported on a ring 29 having an annular clearance at 30 from the shaft 15, the ring in turn being removably supported within the tubing on inwardly projecting pins or screws 31. As in the previously described form of the invention, the individual tubing sections, shown to be connected by collars 32 and made up from standard weight pipe, may contain any suitable number of individual bearing assemblies. In assembling a series of bearings of the form shown in Fig. 5, within a single section or stand of tubing, the lowermost retaining ring 29 first is inserted on its supporting screws, the ball elements then filled in through the upper disconnected end of the tubing, the screws and retaining ring of the bearing next above then inserted and the balls filled in, and so on until the entire series of bearings are assembled.

In connection with such a bearing form as shown in Fig. 5, or any form where the mass of elements is in the shape of a simple annulus, the bearing mass may be conveniently supplied, and applied to the shaft and housing, in the form of a package, such as shown in Fig. 9. Such a package comprises the mass of elements 28 contained in a wrapping or covering 55 of any suitable material that is either disintegrable, as paper, or that has somewhat the same properties as the bearing elements, as lead foil. A package of the type described may be slipped into place in the housing around the shaft and the disintegrability or deformability of the covering 55 allows the bearing mass to perform in the same manner that I have described.

The form shown in Fig. 5 has so far been described as if the uppermost bearing elements 28 were not confined in any manner or to any degree. The bearing will operate satisfactorily in that manner, but the few topmost elements may be thrown around, undesirably. Accordingly I show in this figure a small loose floating weight-ring 22a which loosely surrounds the shaft, has freedom in the housing 17, and rests on the mass of elements 28. A very small weight will prevent the uppermost elements from throwing, and does not positively confine the elements vertically so as to prevent their mobility of adjustment movement. And I find that the weight of such a ring 22a may be increased substantially beyond that necessary merely to prevent throwing of the elements, and with good results, and without vertically confining the elements to the prevention of their mobility, as would result were the elements positively and tightly vertically confined from above. For instance, I have found that a weight ring of about one pound weight in a bearing about one and one-half inches diameter is advantageous in inducing the uppermost elements to adjust themselves quickly to final adjusted position under a small weight-pressure, just as the lowermost elements do under the weight pressure of the elements above them. Thus I may preferably use this simple light weight ring to prevent throwing of the uppermost elements instead of the spider of Figs. 1 etc. The spider has a function tending to prevent the bodily rotation of the whole mass of elements if the mass as a whole should tend to rotate. But usually, I find, friction of the mass on the inner surface of the housing wall is sufficient to prevent rotation of the mass as a whole, and the simple weight ring prevents throwing.

The weight ring also has the function of applying a small yielding force endwise to the whole mobile mass, and thus is a means of applying a small controllable force to the lowermost as well as the uppermost elements to induce them to adjust themselves to proper position. At the same time, this force being relatively small and yielding, it does not confine the elements against endwise movement as a positive confinement would, and thus does not prevent, but rather induces the adjustment movements. And I may remark that such a yielding force, without substantial or positive endwise confinement, is applied to the lower elements of the mobile mass by the weight of the elements above them, and may be increased as desired by lengthening the vertical height of the mobile mass.

The bearings so far described have been shown applied to an enclosed line shaft, where the tubing 17 forms a housing for the shaft as well as a housing for the bearings. All the forms of the invention are as readily applicable to an open line shaft, and Figs. 6 and 7 show further variant forms so applied. In Figs. 6 and 7 the line shaft 15 and eduction pipe 13 are shown as before. Here however the shaft is not enclosed and the bearing housing 17a is in the form of a tubular member having an apertured bottom 17b through which the shaft passes loosely. The housing 17a is shown typically as being carried on a spider 35 whose periphery may be clamped between adjacent ends of sections or lengths of eduction pipe 13, although the housing may be mounted in any other manner suitable. In both these bearings I have shown a mass of irregular bearing elements 28a, such for instance as the machine tool cuttings referred to. Such cuttings or chips may be of a large range of sizes, the average size being dependent of course on the size of the bearing mass as a whole. For instance, in a bearing for a five-eighths inch shaft, one and one-half inches in diameter, I have found that irregular cuttings of lead-bronze averaging about three-sixteenths inch in length and width and about one-sixteenth inch thick, are quite satisfactory. A suitable lead-bronze is one containing 35% to 40% lead. Such an alloy is sufficiently soft and deformable to form contact surfaces instead of points, and is self lubricating.

In Fig. 6 the uppermost elements are simply free; the space under the confining cap 17c is not completely filled. In Fig. 7 the bearing elements rest on a free loose collar 29a, a similar collar 29b rests on them, and the loose weight ring 22b rests on that collar. A cap 17d closes the housing top. The shaft passes with clearance through both the caps 17c and 17d of Figs. 6 and 7.

Fig. 8 shows how a simple arrangement of fins may be used to prevent positively any bodily rotation of the mobile mass of bearing elements with the shaft. Ordinarily the friction of the bearing element with the inner surface of the housing is sufficient to prevent rotation of the mass, but if not then either such a free cage as shown in Fig. 1, or fixed fins or the like as shown in Fig. 8 may be used. The fins 40, as here shown, project inwardly from the housing wall and may have a vertical extent substantially the length of the bearing.

All the illustrative forms so far described have the same characteristic advantages with respect to self-adjustment to the shaft, automatic take-up of wear, ease of assembly, removal and replacement. The material of the bearing elements is preferably one which is relatively soft and deformable; and among such materials it may also be preferable to choose those which are self-lubricating. Whether self lubricating or lubricated with any suitable liquid, these bearings contact the entire periphery of the shaft at all times, preventing vibration at high speeds, and due to their mobility they cannot at any time freeze the shaft.

I have described my bearing as applied to a shaft which has a tendency to self-alinement due to longitudinal tension. It will be understood however that the bearing has utility and will perform its described functions with reference to any shaft that for any reasons or by any means either has a tendency to aline itself or has no or little tendency to move out of a fixed alinement.

This application is filed as a continuation-in-part of my previously filed co-pending application, Serial No. 219,366, filed July 15, 1938, entitled Bearing shaft.

I claim:

1. A bearing structure for a vertically extending rotatable shaft, comprising a bearing housing surrounding said shaft, a bearing assembly comprising a mobile mass of interengaging bearing elements contained within said housing and engageable with the shaft, and means preventing bodily rotation of said elements about the shaft.

2. A bearing structure for a vertically extending rotatable shaft, comprising a bearing housing surrounding and annularly spaced from said shaft, a bearing assembly comprising a mobile mass of interengaging bearing elements contained within said housing and engageable with the shaft, and means for exerting on one end of said mobile mass a yielding endwise directed force, said shaft having lateral freedom with relation to said housing for lateral movement of self alinement.

3. A bearing structure for a vertically extending rotatable shaft, comprising a bearing housing surrounding said shaft, a bearing assembly comprising a mobile mass of interengaging bearing elements contained within said housing and engageable with the shaft, and a free ring surrounding the shaft and resting on the uppermost of said elements.

4. A bearing structure for a vertically extending rotatable shaft, comprising a bearing housing surrounding and annularly spaced from said shaft, a bearing assembly comprising a mobile mass of interengaging bearing elements contained within said housing and engageable with the shaft, said bearing elements being irregular in form and of a relatively soft and deformable material, and means for exerting on the uppermost of said elements a yielding downwardly directed force, said shaft having lateral freedom with relation to said housing for lateral movement of self alinement 5. A bearing structure for a vertically extending rotatable shaft, comprising a bearing housing surrounding said shaft, a bearing assembly comprising a mobile mass of interengaging bearing elements contained within said housing and engageable with the shaft, and a free cage loosely placed about said shaft and having vertically extending circularly spaced slots through which the bearing elements engage the shaft.

6. A bearing structure for a vertically extending rotatable shaft, comprising a bearing housing surrounding said shaft, a bearing assembly comprising a mobile mass of interengaging bearing elements contained within said housing and engageable with the shaft, a free cage loosely placed about said shaft, said cage having openings through which the bearing elements engage the shaft and a lower flanged portion vertically supporting said elements, and means for supporting the cage within the housing.

7. A bearing structure for a vertically extending rotatable shaft, comprising a bearing housing surrounding the shaft and annularly spaced therefrom, a bearing assembly comprising a mobile mass of bearing elements contained within the housing and engaging the shaft, and means for supporting said mass of bearing elements in the housing, said shaft having lateral freedom with relation to said housing and said supporting means for lateral movement of self-alinement.

8. A bearing structure for a vertically extending rotatable shaft, comprising a bearing housing surrounding said shaft and annularly spaced therefrom, said shaft being free in said housing to laterally seek its own alinement, a bearing assembly comprising a mobile mass of bearing elements contained within the housing and engaging the shaft, means for supporting said mass of bearing elements from below, said means allowing the shaft lateral freedom, and said mass of bearing elements being substantially vertically unconfined except for its said support.

9. A bearing structure for a vertically extending rotatable shaft, comprising a bearing housing surrounding the shaft and annularly spaced therefrom, a bearing assembly comprising a mobile mass of bearing elements contained within the housing and engaging the shaft, and means for supporting said mass of bearing elements in the housing, said shaft having lateral freedom with relation to said housing and said supporting means for lateral movement of self-alinement, and said bearing elements being of relatively soft and deformable material.

10. In a well pump of the character described having a vertically extending rotatable shaft relatively long and flexible, tubing enclosing said shaft and annularly spaced therefrom, bearing assemblies journalling said shaft at longitudinally spaced points in the tubing, each of said assemblies comprising a support mounted on the tubing and spacedly surrounding the shaft, and a mobile mass of interengaging bearing elements contained in the tubing, surrounding and engaging the shaft and resting on said support, the shaft having lateral freedom within the tubing and said supports for lateral self-alinement.

11. In a well pump of the character described having a vertically extending rotatable shaft relatively long and flexible, tubing enclosing said shaft and annularly spaced therefrom, bearing assemblies journalling said shaft at longitudinally spaced points in the tubing, each of said assemblies comprising a support mounted on the tubing and spacedly surrounding the shaft to allow it lateral freedom for self-alinement, and a mobile mass of interengaging bearing elements contained in the tubing, surrounding and engaging the shaft, resting on said support but otherwise substantially unconfined longitudinally of the shaft to render the shaft self-alining.

12. In a well pump of the character described having a bearing housing, a rotatable shaft extending axially into the housing and annularly spaced therefrom, a mobile mass of bearing elements disposed in said space and engaging said shaft, means extending inwardly from and supported on the housing and spaced from the shaft to constitute a support for the bearing elements at the lower ends thereof, said bearing elements being substantially vertically unconfined at their upper ends, the clearance between the inner wall of the housing and said shaft and the clearance between the supporting means and said shaft coacting with the vertically unconfined mobile mass of bearing elements to provide lateral freedom of movement of the shaft for self-alinement thereof.

13. In a well pump of the character described having a bearing housing, a rotatable shaft extending axially into the housing and annularly spaced therefrom, a mobile mass of bearing elements disposed in said space and engaging said shaft, means extending inwardly from and supported on the housing and spaced from the shaft to constitute a support for the bearing elements at the lower ends thereof, said bearing elements being substantially vertically unconfined at their upper ends, the clearance between the inner wall of the housing and said shaft and the clearance between the supporting means and said shaft coacting with the vertically unconfined mobile mass of bearing elements to provide lateral freedom of movement of the shaft for self-alinement thereof, said bearing elements being of relatively soft and deformable and self-lubricating material.

14. A bearing structure for a vertically extending rotatable shaft, comprising a bearing housing surrounding the shaft and annularly spaced therefrom, a bearing assembly comprising a mobile mass of bearing elements filling the space between the housing and the shaft and engaging the shaft, and means for supporting said mass of bearing elements in the housing, all the bearing elements of the mobile mass being in mutual contact and of diametral sizes not more than one-half the radial spacing of the housing and shaft, said mobile mass of bearing elements having substantial freedom at its upper end with reference to vertical movement, all so that the bearing elements are mutually bodily movable with reference to each other.

JOHN A. WINTROATH.